United States Patent [19]

Linlor

[11] 4,246,067
[45] Jan. 20, 1981

[54] THERMONUCLEAR FUSION SYSTEM

[76] Inventor: William I. Linlor, 1010 Madison Dr., Mountain View, Calif. 94040

[21] Appl. No.: 938,321

[22] Filed: Aug. 30, 1978

[51] Int. Cl.³ .............................................. G21B 1/02
[52] U.S. Cl. ........................................... 176/3; 176/5
[58] Field of Search ................... 176/1, 3, 4, 5, 7, 9, 176/2

[56] References Cited

U.S. PATENT DOCUMENTS

| | | | |
|---|---|---|---|
| 3,085,173 | 4/1963 | Gibson et al. | 176/3 |
| 3,093,765 | 6/1963 | Preuot | 176/3 |
| 4,065,351 | 12/1977 | Jassby et al. | 176/3 |
| 4,115,191 | 9/1978 | Ott et al. | 176/5 |

FOREIGN PATENT DOCUMENTS 844291  8/1960  United Kingdom ......................... 176/3

OTHER PUBLICATIONS

IEEE Trans. Plas. Sci., vol. PS-6, No. 3 (9/78, pp. 270-295.
Physics Today (5/79) pp. 25-32, Murakami et al.
IEEE Trans. on Nuc. Sc., vol. NS-22, No. 3 (6/75) pp. 1790-1793, Maglich et al.
Phys. Rev. Lett., vol. 27, No. 14 (10/4/71) pp. 909-912, Maglich et al.

*Primary Examiner*—S. A. Cangialosi

[57] ABSTRACT

This invention discloses apparatus and methods to produce nuclear fusion utilizing fusible material in the form of high energy ion beams confined in magnetic fields. For example, beams of deuterons and tritons are injected in the same direction relative to the machine axis, but the deuteron velocity is sufficiently greater than the triton velocity so that the deuterons overtake the tritons at a relative velocity which produces a high fusion reaction cross section. The momentum of the deuterons is approximately equal to the momentum of the tritons so that both types of ions follow essentially the same path. Thus, the deuteron and triton beams, together with electrons for space charge neutralization, constitute a "moving-plasma", in which fusion reactions occur. Various alternative magnetic field configurations are described for confinement of the high energy ion beams. Methods are given for the starting and steady-state operation of the invention, based on change-of-charge-state trapping of injected material.

12 Claims, 10 Drawing Figures

THERMONUCLEAR FUSION SYSTEM

INTRODUCTION

This invention discloses apparatus and methods to produce nuclear fusion, utilizing fusible material in the form of high energy ion beams confined in magnetic fields. For example, beams of deuterons and tritons are injected in the same direction relative to the axis of a vacuum chamber, and irradiated by a laser beam of sufficient intensity so that a change of charge state occurs for the injected material (the injected ions can be molecular ions, and the final ions can be single ions), before the injected material reaches the region where the axis changes from a straight line to a semi-circular one. The momentum of the deuterons is approximately equal to the momentum of the tritons, so that both types of ions follow the same path. The velocity of the deuteron is sufficiently greater than the velocity of the triton so that overtaking collisions occur at a relative velocity which produces a high fusion reaction cross section. Electrons for space charge neutralization are obtained by ionization of residual gas in the vacuum chamber. When sufficiently intense deuteron and triton beams have been produced as just described, the laser beam can be removed, and subsequent change of charge state can be achieved by collisions of the injected material with the circulating beams. The ion beams are guided (i.e., confined) by various types of magnetic fields, such as alternating-gradient magnets, or the magnetic fields of long solenoids, in the straight portions; at the end regions, cyclotron-type magnets can be used to reverse the direction of the beams. Thus the configuration in general consists of a "race-track" shape for the axis of the machine, which is also the axis of a vacuum chamber within which the ion beams circulate after injection and trapping by the change in charge state. The deuteron and triton beams circulate in the same direction, which causes their individual magnetic fields to add constructively, which helps to confine the individual ions and electrons. The products of the fusion reactions, such as neutrons and alpha particles, escape to the walls surrounding the vacuum chamber, producing heat.

Prior art dealing with fusion research is extensive; representative summaries are given in Appendix A, which may be consulted for explanation of scientific terms that are employed in this patent description. Although many patents have been issued for "fusion systems", to date none of these systems has reached the milestone of releasing fusion energy equal to the amount originally invested in the plasma. Indeed, all systems that have been tested experimentally have fallen far short of this "break-even" goal.

Two general approaches have been developed during the past decades of fusion research: One is "inertial confinement" in which the nuclei react during a time that is less than the disassembly time (because of the inertia of the particles). The second is "magnetic confinement" employing configurations of magnetic fields termed mirror-machine, stellarator, tokomak, etc. These are described in the references of Appendix A. In each case, the nuclei are "thermalized" in the sense that fusion reactions occur via essentially "head-on" impacts; stated alternatively, the nuclei have distributions in velocity and in angle, somewhat resembling the case of molecules of gas in a container.

For the plasmas of all present-day fusion devices, the center of mass is stationary in the laboratory frame of reference, just as it is true for the molecules of a gas in a container. This point is important, because for the invention to be described below, the center of mass of the energetic nuclei has a high velocity in the laboratory frame of reference. This is a crucial feature of the present invention, having characteristics and advantages described in the following pages.

In the past, considerable interest was devoted to "better" magnetic field configurations, so that high-temperature plasma would be confined for greater lengths of time. In contrast, the present invention will show that fusible ions, "thermalized" in a moving center-of-mass frame of reference, can be confined adequately in a variety of magnetic fields. Some of the configurations to be described may have a superficial resemblance to a mirrow-machine, or stellarator, or tokomak, but other configurations will be described that have no counterpart in present-day fusion research. The key ingredient of the present invention is the confinement of the novel "moving-plasma" in the magnetic field, as will be evident from the following material.

Another important point to be noted is that the operating regime of a thermonuclear fusion system may differ markedly from its "start-up" regime. For the present invention, the production of the initial moving-plasma requires unique procedures which will be described; these are not necessary after the operating conditions are achieved.

Descriptions will be given for a variety of systems, all based on the unique concept of a "moving-plasma" in a magnetic field, with drawings to illustrate the relationship of the components. Certain basic novel features are common to all of the various embodiments; these are described in the next section, together with mathematical quantities and equations. Advantages of this invention is regard to "plasma stability", space-charge neutralization, etc. are described in subsequent sections.

NOVEL FEATURES OF INVENTION

This invention relates to a novel method for producing nuclear fusion, using a "moving-plasma" confined in a magnetic field. The method consists of utilizing fusible material in the form of energetic beams so that the ions interact to produce fusion reactions, or in order to provide an abundant source of neutrons, or both. More specifically, the invention contemplates the use of fusible ions in such a way that the paths of the ions are essentially coincident, thus producing approximately continuous reaction paths. The speeds of the ions are selected so as to achieve important objectives: first, reasonably high values for the fusion reaction rates; second, over-lapping paths; and third, low loss rates for beam particles.

In fusion literature to date, the concept of "colliding beams" has been based on configurations such that the beams are oppositely directed, causing "head-on" collisions. Claims have been published that for such oppositely-directed beams, Coulomb collisions (i.e., the interaction of two ions having the same sign of electric charge) would cause loss of beam particles and loss of beam energy (carried by the ions) before appreciable nuclear fusion reactions would occur. However, the concepts that are disclosed in this patent application are new, and are not subject to the limitations ascribed to "head-on" colliding beams.

Many different fusible substances can be employed in the form of energetic ion beams, within the scope of this invention, such as deuterons with tritons; also protons with boron ($B^{11}$) ions; and other fusible fuels. The description of the invention is facilitated by consideration of deuterium and tritium, whose ionic forms are known as deuterons and tritons, usually abbreviated by the letters D and T respectively.

Five novel features of this invention will now be identified, using deuterons and tritons for illustration.

1. The first major novel feature of this invention is the use of energies for the deuterons and tritons such that the deuterons overtake the tritons at a relative velocity which produces a high fusion reaction cross section. This is in distinct contrast to "conventional" thermonuclear fusion experiments and machines in which the directions of the deuterons and tritons are substantially opposite, producing "head-on" collisions. In the present invention, the fusion reactions are produced by "overtaking collisions", which is a concept that no other proposed thermonuclear fusion machine or device has envisioned.

The well known fusion reaction of deuterium and tritium is $$D + T \rightarrow He^4(3.5 \text{ Mev}) + n(14.1 \text{ Mev}) \tag{1}$$

where $He^4$ represents helium having atomic mass of 4, and n represents a neutron.

From published fusion literature, such as FIG. 2.3 of Glasstone and Lovberg's book (see Appendix A), it is known that the maximum deuteron-triton (i. e., "DT") fusion cross section occurs when a deuteron having about 120,000 electron-volts of energy is incident on a target triton. This can be alternatively stated in terms of the relative velocity of the deuteron and triton: the maximum DT fusion cross section occurs when the D velocity relative to the T ion lies between $3 \times 10^8$ cm/sec and $4 \times 10^8$ cm/sec. To be specific, let us select for illustration the value of $4 \times 10^8$ cm/sec as the velocity of the deuteron relative to the target triton; the corresponding fusion cross section is about $4 \times 10^{-24}$ cm$^2$.

Thus the first important relation involved in this invention can be written (for this illustrative example) as follows:

$$V_D = V_T + 4 \times 10^8 \text{ cm/sec} \tag{2}$$

where $V_D$ and $V_T$ represent the deuteron and triton velocities in the laboratory reference frame, both expressed in cm/sec. Note that in this invention a target triton is not at rest in the laboratory frame of reference, but has a velocity $V_T$. We should note also that the preceding equation need not be satisfied exactly, but it represents a desirable criterion; namely, the relative velocity between the triton and the overtaking deuteron for which the fusion reaction cross section is near the peak value. Fusion reactions can occur, although at a different cross-section value, if the deuteron velocity is greater or less than the illustrative value given by equation (2).

2. The second major novel feature of this invention is the use of currents that are additive. The currents associated with the motion of the deuterons and tritons (i. e., the ion beams) are in the same direction; therefore, the magnetic fields of these beams add constructively, producing mutual attraction between the individual beams, thus enhancing the confinement of the total beam. Furthermore, the magnetic fields of the deuteron and triton beams serve to help contain the electrons that are necessary for neutralization of the space-charge of the ions, and also serve to contain ions that otherwise would be scattered out of the combined beam.

This novel feature can be described in mathematical terms. The deuteron, triton, and net beam currents are:

$$I_D = n_D V_D A_D e / C \text{ amperes} \tag{3}$$

$$I_T = n_T V_T A_T e / C \text{ amperes} \tag{4}$$

$$I_B = I_D + I_T \text{ amperes} \tag{5}$$

The subscripts D and T refer to deuterons and tritons; n represents the number of ions per cm$^3$; V represents the velocity in cm/sec; A represents the effective area of the beam in cm$^2$; e represents the electric charge of the deuteron or triton; C represents the number of electric charges in a Coulomb of electricity; and I represents the ion beam current, with $I_B$ representing total ion beam current. Since $V_D$ and $V_T$ are in the same direction, the currents $I_D$ and $I_T$ are additive, as shown by equation (5).

The total ion beam current, $I_B$, produces a magnetic field, $B_B$, at the outer radius, $R_B$, of the beam:

$$B_B = 0.2(I_D + I_T)/R_B \text{ gauss} \tag{6}$$

This relation applies for currents in amperes and radius in cm. The magnetic field, $B_B$, helps to confine ions within the radius $R_B$. Electrons within the beam radius are also confined by the magnetic field $B_B$. The electrons are of course necessary to provide space-charge neutralization of the total beam. The role of the electrons is discussed more extensively in a later section.

3. The third major novel feature of this invention relates to "closed paths", exemplified by circular, oval, or "race-track" configurations. For such re-entrant systems, a magnetic field is necessary at each end to turn the beams around so as to re-trace the paths. The novel feature is the use of deuteron and triton energies such that each ion (D or T) has essentially the same turning radius in the magnetic field that is perpendicular to the ion path. An equivalent statement of this condition is that the momentum of the deuteron ions should be approximately equal to the momentum of the triton ions.

In a magnetic field of B gauss perpendicular to the velocity vector of an ion, the turning-radius of the ion is given by:

$$BeR_D = M_D V_D \tag{7}$$

$$BeR_T = M_T V_T \tag{8}$$

where $R_D$ and $R_T$ are respectively the radius of curvature of the paths of the deuterons and tritons in the magnetic field B; the other symbols have already been defined above. The mass of the deuteron and triton is given, respectively, by the symbol $M_D$ and $M_T$.

For a re-entrant configuration, such as a circular, oval, or "race-track" configuration, all ions should traverse essentially the same path, which implies that $$R_D = R_T \tag{9}$$

Equation (9) implies that the deuteron momentum $M_D V_D$ should be equal to the triton momentum $M_T V_T$, by virtue of equations (7) and (8). This is stated explicitly as:

$$M_D V_D = M_T V_T \qquad (10)$$

On the "atomic scale" of units, it is well known that the masses of deuterons and tritons are given by $$M_D = 2 \text{ and } M_T = 3 \qquad (11)$$

which can be substituted into equation (10) to yield:

$$V_D = (M_T/M_D) \times V_T = (3/2) V_T \qquad (12)$$

Equations (2) and (12) are sufficient to specify important relations:

$$V_T = 8 \times 10^8 \text{ cm/sec} \qquad (13)$$

$$V_D = 12 \times 10^8 \text{ cm/sec} \qquad (14)$$

We note that for the deuteron and triton velocities given by equations (13) and (14), the deuterons overtake the tritons at the relative velocity of $4 \times 10^8$ cm/sec, for which the fusion cross section is near the maximum value; additionally, the radius of curvature (also termed turning-radius) of the paths of the deuteron and triton in the magnetic field are equal.

The kinetic energies of a deuteron, $W_D$, and a triton, $W_T$, are obtainable from equations (13) and (14); these are:

$$W_D = 1.50 \times 10^6 \text{ electron-volts} \qquad (15)$$

$$W_T = 1.00 \times 10^6 \text{ electron-volts} \qquad (16)$$

It should be understood that the ion velocities and the ion kinetic energies are selected so as to obtain approximately the peak value for the fusion cross section via "overtaking collisions". Values other than the optimum, but based on the principle described above, can permit operation of the invention in the desired manner, although at a reduced value for the fusion cross section. If the momenta of the various ions are not exactly equal, the paths would not be exactly coincident; however, in practical embodiments of this invention, provision would be made in the machine dimensions and beam apertures so that departures from the optimum values of velocity, momentum, etc. could be accomodated, thus permitting satisfactory operation of the device.

4. The fourth major novel feature of this invention is that scattering caused by Coulomb collisions between the deuterons and tritons of the beam is limited by the effect of "center-of-mass" motion. The scattering of the beam particles in the laboratory frame of reference is sufficiently small so that the particles maintain a high degree of ordered motion, and retain the "beam" character even after repeated Coulomb collisions.

To analyze the scattering effects, we use the concepts of "center of mass motion" and relative velocity in the "center of mass system". For convenience, the abbreviation CM is used for "center of mass". This is now described.

As was shown in Section 3 above, for the deuteron and triton ions in the magnetic field, we require that their momenta be approximately equal, with the result previously obtained:

$$V_D = 12 \times 10^8 \text{ cm/sec} \qquad (14)$$

$$V_T = 8 \times 10^8 \text{ cm/sec} \qquad (13)$$

Using the "atomic scale" of units, in which the masses of the deuterons and tritons are respectively 2 and 3, the momentum of the center of mass is:

$$M_C V_C = M_D V_D + M_T V_T \qquad (17)$$

where $V_C$ represents the velocity of the center of mass and $M_C$ represents the mass of the center-of-mass unit, given by:

$$M_C = M_D + M_T = 2 + 3 = 5 \qquad (18)$$

Substituting equations (13), (14) and (18) in equation (17), we obtain $$M_C V_C = 2 \times 12 \times 10^8 + 3 \times 8 \times 10^8 = 48 \times 10^8 \qquad (17)$$

The velocity of the center-of-mass unit is thus given by:

$$V_C = (M_D V_D + M_T V_T)/(M_D + M_T) = 9.60 \times 10^8 \text{ cm/sec} \qquad (19)$$

In the CM frame of reference, the relative velocities of the deuterons and tritons are given by:

$$\begin{aligned} _C V_D &= V_D - V_C \\ &= 12 \times 10^8 - 9.60 \times 10^8 \text{ cm/sec} \\ &= 2.40 \times 10^8 \text{ cm/sec} \end{aligned} \qquad (20)$$

$$\begin{aligned} _C V_T &= V_T - V_C \\ &= 8 \times 10^8 - 9.60 \times 10^8 \text{ cm/sec} \\ &= -1.6 \times 10^8 \text{ cm/sec} \end{aligned} \qquad (21)$$

The significance of the two preceding equations, (20) and (21), is that the deuterons are heading toward the center of mass with the (relative) velocity of $2.4 \times 10^8$ cm/sec, and the tritons are heading toward the center of mass with the (relative) relative velocity of $1.6 \times 10^8$ cm/sec. The deuterons and tritons have a relatively velocity of $2.4 \times 10^8$ cm/sec plus $1.6 \times 10^8$ cm/sec, totaling $4.0 \times 10^8$ cm/sec, which is equally true in the laboratory frame of reference or the center-of-mass frame of reference.

For the CM frame of reference:

$_C V_D = 2.40 \times 10^8$ cm/sec
$_C V_T = -1.60 \times 10^8$ cm/sec
$_C W_D = 60 \times 10^3$ electron-volts
$_C W_T = 40 \times 10^3$ electron-volts
$V_C = 9.60 \times 10^8$ cm/sec where $_C W_D$ and $_C W_T$ represent the deuteron and triton kinetic energy with reference to the CM frame of reference.

The Coulomb collisions between deuterons and tritons produce a distribution of velocities. In the CM frame of reference, the effect of repeated collisions may cause a rotation of the relative velocity vector, $_C V_D + _C V_T$ through 90 degrees. This is approximately the maximum scattering that can occur for the majority of the ions. A more precise calculation of the scattering can be made employing the Fokker-Planck equations for the ions, but this would be inappropriate in a patent disclosure because of the length of the analysis.

To obtain the order-of-magnitude of the maximum scattering angle, in the laboratory frame of reference, we divide the lateral velocity by the center-of-mass velocity. For a deuteron:

$$\theta_D = \arctan {}_cV_D/V_C = \arctan 2.4 \times 10^8 / 9.6 \times 10^8 \quad (22)$$
$$= \arctan 0.25 = 14 \text{ degrees}$$

For a triton:

$$\theta_T = \arctan {}_cV_T/V_C = \arctan 1.6 \times 10^8 / 9.6 \times 10^8 \quad (23)$$
$$= \arctan 0.17 = 9.5 \text{ degrees}$$

From the preceding discussion it is evident that the ions can essentially "thermalize" in the CM frame of reference, but at the same time retain the beam character in the laboratory frame of reference.

Stated alternatively, for the present disclosure the ions have "head-on" impacts in the center-of-mass system, but because the center of mass has a high velocity in the laboratory frame of reference, the ions all continue to travel in essentially a beam in the laboratory frame of reference. This fact makes it feasible to confine the ions in a variety of alternative magnetic field configurations, as will be described below.

The role of electrons (necessary for space-charge neutralization) will be described below. The electrons can also be included in the system in the form of a beam.

5. The fifth major novel feature of this invention is that the energy in the beams, necessary to produce the "over-taking" state, can be recovered when the beams are brought to rest at the end of the fusion cycle. This applies to the "unused" beams; i. e., the portion that has undergone Coulomb collisions, but the not reacted nuclearly in the fusion process. The preceding section has shown that despite the presence of Coulomb collisions, the beam retains its "directed" nature, thus permitting reextraction of the kinetic energy.

The relations can be expressed in mathematical form as follows. Let $E_i$ represent the conversion efficiency of electrical energy (from the power lines) into beam energy, and let $E_o$ represent the conversion efficiency of beam energy (at the end of the fusion cycle) into electrical energy.

Per cm³ of beam, the input kinetic energy of the deuterons and tritons is:

$$KE_i = n_D W_D + n_T W_T \quad \text{electron-volts per cm}^3 \quad (24)$$

The energy input from the power lines to produce this amount of beam energy is:

$$W_i = KE_i/E_i \quad (25)$$

After the fusion cycle, the number per cm³ of deuterons and tritons in the beam are given $n_D'$ and $n_T'$, and the corresponding kinetic energy is $$KE_o = n_D' W_D + n_T' W_T \quad \text{electron-volts per cm}^3 \quad (26)$$

The energy return to the power lines from this amount of beam energy is:

$$W_o = (KE_o) \times E_o \quad (27)$$

The recovery of kinetic energy from the beams is desirable, since the basic objective of a fusion machine is the production of net energy gain. Embodiments for such energy interchange will be described in later sections.

SUMMARY OF THE INVENTION

This invention relates to a novel method for producing nuclear fusion, using a "moving plasma" confined in a magnetic field. The invention contemplates the use of fusible ions in such a way that the paths of the ions are essentially coincident, thus producing approximately continuous reaction paths.

The speeds of the ions are selected so that the momentum is proportional to the number of positive charges of the ion; for example, the momentum of a deuteron is selected to be approximately equal to the momentum of a triton, since each carries the same electric charge. The ion beams have the same direction relative to the machine axis, but the deuteron velocity is greater than the triton velocity, so that overtaking collisions occur. This relative velocity is selected so as to produce a high fusion reaction cross section.

The fusible ion beams (deuterons and tritons, for example), together with electrons for space-charge neutralization, constitute a "moving-plasma" in the laboratory frame of reference. Because of the center-of-mass motion, scattering angles become reduced when referred to the laboratory frame of reference. For example, deuterons and tritons are limited to scattering angles of less than 15 degrees in the laboratory frame of reference, even though they have been scattered through an angle of 90 degrees in the center-of-mass frame of reference.

Because both the deuteron and triton beams have the same direction relative to the machine axis, the combined current produces a magnetic field surrounding it, which serves to provide confinement for the individual ions and the space-charge-neutralizing electrons. A current, equal and opposite to the net beam current, is produced by an external supply, and is caused to flow in the walls of the vacuum chamber. This symmetrically encloses the net beam current.

The basic configuration for this invention consists of two long, straight units, each of length L centimeters, connected at the ends by essentially semi-circular portions. Fusible particles in the form of high-energy neutrals or molecular ions are injected into the straight sections, then are irradiated by laser beams so that a change in charge state occurs; essentially all of the injected material becomes ionized during traversal of the length L. The injected material is added (or "stacked") to the already trapped ions, to build up a high density of confined ions. When sufficiently high ion density is achieved, the laser irradiation is no longer necessary, and can be turned off, because the change-of-charge state can occur via collisions of the injected particles and the already trapped beam ions.

The fusion reaction products are not contained by the magnetic fields, but release their kinetic energy as heat in the walls surrounding the vacuum chamber.

The beam particles that have not participated in fusion reactions can return their kinetic energy to the original source by means of induction magnets that surround the long, straight units.

Six different magnetic field configurations are shown in this patent disclosure. The first consists of "alternating-gradient" magnets arranged in essentially straight lines in the length L, and in essentially semi-circular arcs at the ends. Alternatively, electric-field alternating-gradient units can be used in place of the magnetic fields.

The second configuration consists of alternating-gradient magnets in the essentially straight portion L, and "cyclotron-type" magnets at the ends.

The third configuration consists of continuous solenoids whose axis is straight for the length L, and is curved in a semi-circle at the ends, to join the two straight lengths.

The fourth configuration is essentially similar to the preceding one, except that the straight portions are caused to cross, as in a figure-eight, with approximately semi-circular regions at the ends.

The fifth and sixth configurations are combined in the disclosure. They consist of the preceding third and fourth configurations, respectively, to which are added "cyclotron-type" turning magnets at the ends.

Items that are well known to those skilled in the art, such as vacuum chambers, vacuum pumps, and the like, are not described in detail, but of course are necessary in order to provide enclosures within which the ion beams can be produced.

The six configurations that are disclosed are intended to be illustrative. It will be apparent to those skilled in the art that numerous variations and modifications may be made within the spirit and scope of this invention, that are not included in the present disclosure because to do so would require excessive length. For the same reason, many details are not included such as windows in the vacuum chamber to permit passage of the injected particles, diagnostic ports and instrumentation to monitor the beams, etc.

To provide an assessment of the capabilities of this invention an illustrative, sample calculation is given and results are tabulated in TABLE I. Evidently, many other beam currents, diameters, machine lengths, etc. can be selected for a practical design, without departing from the basic features of this invention.

BRIEF DESCRIPTION OF THE DRAWINGS

In the drawings, like elements are referenced alike.

OBJECTIVES OF THE INVENTION

The basic objective of the invention is the production of thermonuclear fusion. Additional objectives include the production of neutrons in copious amounts to be used in other nuclear reactions.

To attain these objectives, the invention must reach the technical objective of "plasma stability", which implies that the trapped and circulating ion beams must be stable until essentially all of the fusible material has unergone nuclear fusion. Such beam stability is reasonable because the ion beams possess a large amount of momentum, so that the present-day "plasma instabilities" encountered in contemporary research cannot deflect the high-energy ion beams from the desired paths. Interaction of the beams with electrons also cannot deflect the ions from the desired paths. Even the "slowing-down" of the beams is very small.

EXAMPLE I: EMBODIMENT WITH ALTERNATING-GRADIENT MAGNETS

Several illustrative embodiments of the present invention will now be given. The first one, involving "alternating-gradient" magnets, is selected because it illustrates the key features of the invention. It is emphasized that the magnetic field system is effective in confining beams of charged particles, but not stationary plasmas. Indeed, the magnetic field system of the present embodiment would be completely unable to confine the types of plasmas that are being investigated in present-day fusion experiments. Thus a clear distinction can be drawn between the present invention and existing approaches.

Figure 1:
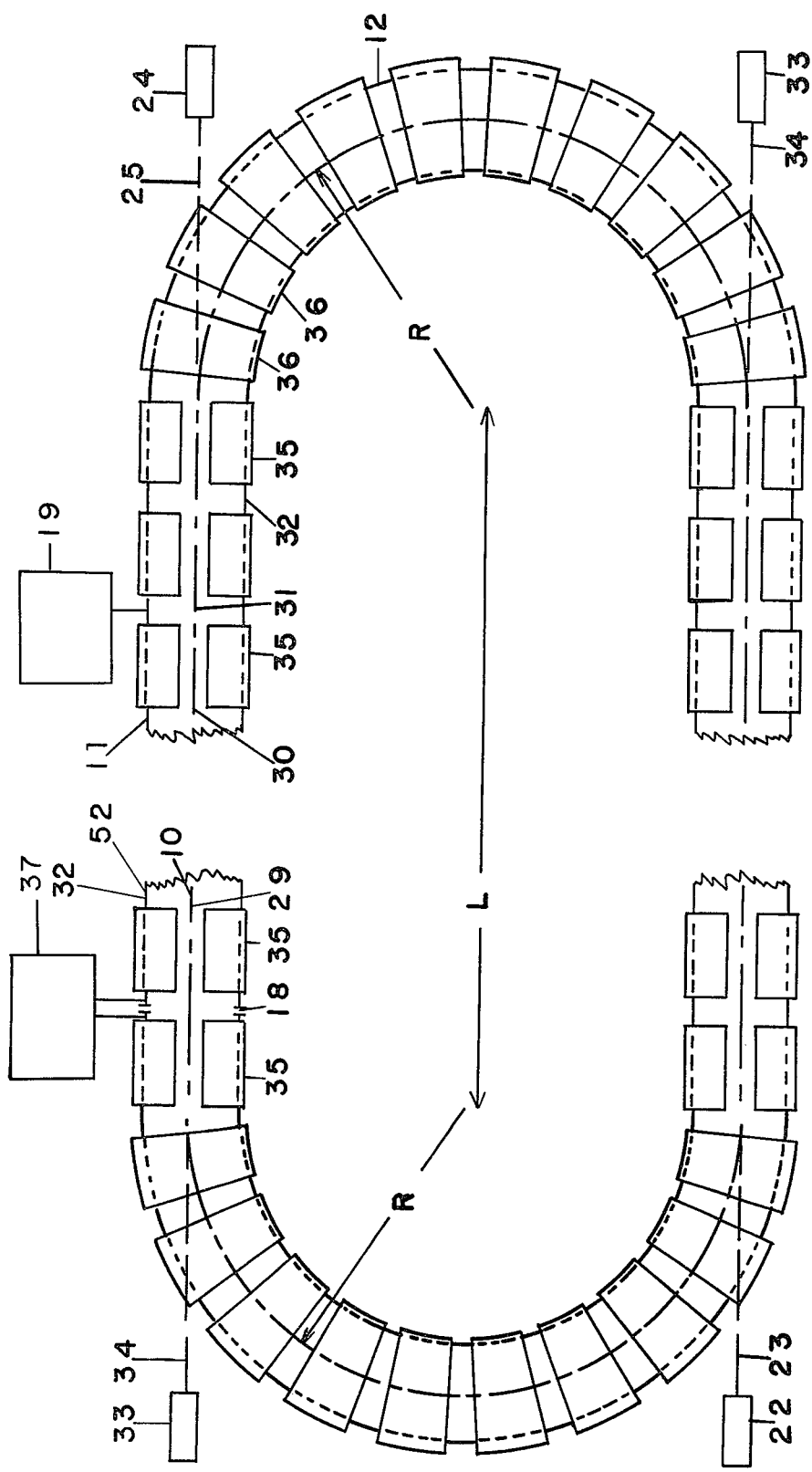
FIG. 1 is a sketch of the component parts of a system using "alternating-gradient" magnets, vacuum chamber, injection and trapping apparatus, and other related items.

The first illustrative embodiment of the present invention is shown in the schematic drawing of FIG. 1. This is intended to show the beam paths of the fusible particles (i.e., deuterons and tritons), and the magnets that control the paths of the beams. The apparatus has a central axis, 10, that resembles a race-track, namely a long straight path of length L (typically of the order of a few kilometers), and curved end regions having a radius of curvature R (typically of the order of one meter).

In FIG. 1, the magnets, 35, provide guide magnetic fields to maintain an approximately straight line path for the ion beams, for the length L. Other magnets, 36, provide guide magnetic fields to maintain essentially semi-circular paths for the ion beams, of radius R.

It may be helpful to note that in present-day fusion experiments, magnetic fields are employed having essentially constant intensity over the distance comparable to the radius of gyration of the ions. The technical term employed to characterize such magnetic fields is "adiabatic" (i.e., slowly-varying along the ion paths). This is true for the well-known magnetic field configurations such as "Mirror-machine," "Stellarator," "Tokomak," "Astron," and the like. No present-day fusion experiment utilizes magnets such as those depicted in FIGS. 1, 2, and 3, which have large and alternating gradients in the confining magnetic fields.

Figure 3:
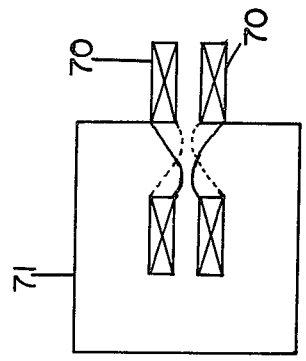
FIG. 3 shows another form of an "alternating-gradient" magnet.
Figure 2:
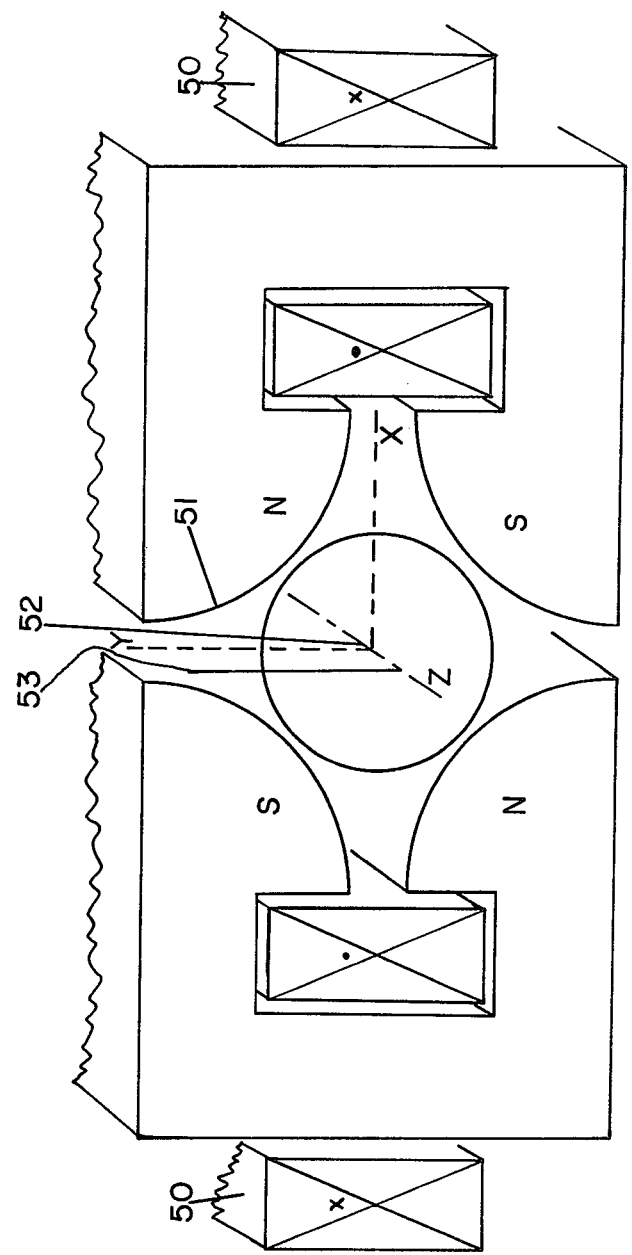
FIG. 2 shows the details of an "alternating-gradient" magnet.

The mathematical relations involved in the beam-holding properties of the magnets depicted in FIGS. 1, 2, and 3 are developed from sophisticated theory, well-known in high-energy accelerator art, and published in books such as "Principles of Cyclic Particle Accelerators," by J. J. Livingood, Chapter 12, D. Van Nostrand Company; and "Particle Accelerators," by Livingston and Blewett, Chapters 5 and 15, McGraw-Hill Book Company.

The magnets, 35 and 36, of FIG. 1 are shown respectively in FIGS. 2 and 3. Such magnets, as is well known in high-energy accelerator art, provide the property termed "alternating-gradient focusing." Customarily the term "alternating-gradient" is shortened to the initials alone, namely "AG," which convention will be employed hereafter in these descriptions when convenient. Because AG focusing is highly effective in confining a beam of charged particles on the desired axis, the substitute term "strong-focusing" is also employed.

For convenience a brief review is given here of the AG magnets with the assumption that a person who is interested in more details can refer to the books previously identified, by Livingood and by Livingston and Blewett.

The magnet depicted in FIG. 2 has four poles, N, S, N, S, and hyperbolic pole shapes so as to provide magnetic field gradients satisfying the relations:

$$B_y = -Kx \quad (28)$$

$$B_x = +Ky \quad (29)$$

where $B_x$ and $B_y$ represent the components of magnetic field in the x and y directions, with the z-axis along the axis, 53, of FIG. 2. A coordinate system is shown in FIG. 2 to facilitate the explanation.

Proceeding in the z-axis direction along the axis, 53, of FIG. 2, the adjacent magnet has four poles in the sequence S, N, S, N, so that their magnetic field gradients satisfy the relations:

$$B_y = +Kx \quad (30)$$

$$B_x = -Ky \quad (31)$$

For ions having a velocity $V_z$ along the z-axis (which is the axis, 10, of FIG. 1 and the axis, 53, of FIG. 2), focusing forces are produced by the $E = B \; V$ effect, where E represents the electric field experienced by an ion having velocity V perpendicular to a magnetic field B. The products of $+B_xV_z$ and $-B_xV_z$ yield positive and negative electric fields respectively whose net effect is a focusing force that returns the ions to the z-axis. Similar focusing effects occur along the y-axis. As mentioned above, these focusing effects are well known in high-energy accelerator art, and are explained in detail in published texts such as referenced above.

The alternating-gradient (AG) forces on the ions are based on values of the parameter, n, defined by:

$$n = -(x/B)(dB/dx) \quad (32)$$

where x is the coordinate distance, B is the magnetic field strength, and dB/dx is the magnetic field gradient. The absolute value of n is much greater than unity for AG magnets, such as depicted in FIG. 2. For comparison it may be noted that the absolute value of n lies between zero and unity for magnetic fields such as employed in the "Mirror-machine," "Stellarator," "Tokomak," "Astron," and the like, and therefore these devices at best can provide only "weak focusing" forces on the ions.

The preceding description of the magnets, 35, in FIG. 1 and shown in FIG. 2 has been concerned with essentially straight-line motion along the length L. The magnets, 36, of FIG. 1 are arranged to guide the deuteron and triton beams around the end portions of the system, with the radius R. The AG magnets for this are shown in FIG. 3, consisting of coils, 70, and the iron portion, 71. The shapes of the magnet pole faces of FIG. 3 are described on page 596 of the previously referenced book by Livingston and Blewett; an alternative sketch is given on page 197 of the previously listed book by Livingood. The solid and dotted lines in FIG. 3 are applicable to successive magnets, showing the pole faces that produce the alternating gradients of the magnetic fields.

This concludes the description of the magnets, 35 and 36, of FIGS. 1, 2, and 3, which provide focusing forces on the beams along the axis, 10, of the system.

A vacuum enclosure, 11, maintains the beam path free from external gases, by means of the vacuum pump, 19. An insulated section in the enclosure wall, 18, permits a current supply, 37, to produce a wall current equal and opposite to the net beam current, 31, flowing along the axis. The deuteron current, 29, and triton current, 30, add to produce the net beam current, 31.

To place the system in operation, an initial start-up procedure is necessary, followed by steady-state operation. An illustrative version is now described for the start-up regime.

An accelerator and neutralizer, 22, produces a beam of high-energy (approximately 1.5 Mev) deuterium atoms, 23, which are directed along the axis, 10, of the machine. Being uncharged, these atoms are unaffected by magnetic fields, and enter the machine through access ports, not shown because such access ports are well known in the accelerator art. Similarly, an accelerator and neutralizer, 24, produces a beam of high-energy (approximately 1.0 Mev) tritium atoms, 25, which are directed along the axis of the machine, 10. As depicted in FIG. 1, the direction of the beams is counter-clockwise as seen from above, for both beams. During the traversal of the length L, the injected neutral beams of deuterium and tritium, 23 and 25 respectively, are irradiated by laser beams, 34, from lasers, 33. The laser beam photons cause ionization of the atoms of deuterium and tritium, producing beams of ions, namely deuterons and tritons, so that essentially no neutral atoms exist when the length L has been traversed. In other words, the injected high-energy neutral atoms are converted by the photon beam into ions during traversal of the length L. The deuterons and tritons, having essentially the same momentum, traverse essentially the same path (namely, the axis of the machine). The velocity of the deuterons is in the same direction as the velocity of the tritons at any place on the axis; however, the deuterons overtake the tritons at the relative velocity such that the fusion cross section is near the peak value.

The injection of neutral deuterium and tritium atoms continues until the density of the ions (deuterons and tritons) reaches or exceeds approximately $10^{13}$ ions per $cm^3$. With this density of ions per $cm^3$, a new regime is reached, which can be termed "steady-state" operation.

To operate the system in steady-state condition, the lasers are not needed. The high-energy neutral deuterium and tritium atoms are injected, as described above, and subsequently become ionized by collisions with the existing beam ions, during traversal of the length L along the axis of the machine. The injected neutral deuterium atoms overtake the existing beam tritons and collide, producing ionization of the deuterium atoms. Similarly, injected neutral tritium atoms are overtaken by existing beam deuterons, producing ionization of the tritium atoms.

The ionization of the neutral atoms within the machine produces "trapping" of the ions in the form of circulating beams. Thus a moderate input of neutral atoms permits the attainment of intense beams of circulating ions. For the idealized situation of negligibly small loss of beam ions, and complete ionization of the injected neutral atoms, after injection for a time T seconds, the beam ion density is equal to the neutral beam density multiplied by VT/2L, where V is the neutral atom velocity in cm/sec, T is the injection time in seconds, and L is the machine length in cm (neglecting the minor effects of the curved ends).

In any practical case, the various losses must be taken into account, of course, but this requires only a small increase in the rate of injection of neutral atoms, to compensate for the losses.

Illustrative calculations are now made for the start-up and steady-state operation, to show that the ionization processes described are practical.

The ionization rate per unit volume of the neutral atoms by the laser beam is given by:

$$dn_D/dt = n_D n_p \sigma_i c \text{ ionizations/cm}^3 \text{ sec} \quad (33)$$

where $n_D$ represents the number of neutral deuterium atoms per cm$^3$,
$n_p$ represents the number of photons per cm$^3$,
$\sigma_i$ represents the ionization cross-section in cm$^2$,
c represents the velocity of light in cm/sec.

The time, $T_L$, required by a deuterium atom to traverse the length L at the velocity $V_D$ cm/sec is $$T_L = L/V_D \text{ seconds} \quad (34)$$

The fraction of the neutral deuterium atoms that are ionized by the laser beam during the traversal of the length L cm is given by $dn_D/n_D$. A laser beam power of about twenty kilowatts per cm$^2$ can be employed, with photons having sufficient energy (approximately 10 electron-volts) to ionize the neutral atoms, the ionization cross-section being approximately $10^{-18}$ cm$^2$. Thus:

$$dn_D/n_D = 10^{-18} (20 \times 10^3 \times 6.24 \times 10^{18}/10)$$
$$10^5/1.2 \times 10^9 = 1$$

The preceding relation shows that essentially all of the injected deuterium atoms are ionized by the laser beam during traversal of the machine length L.

Similarly a calculation can be made for the ionization rate per unit volume of the neutral atoms by collisions with the existing beams, which is given by:

$$dn_D/dt = n_D n_T \sigma_c V_{rel} \quad (35)$$

where $n_D$ and $n_T$ represent the number of deuterium atoms and the number of tritons per cm$^3$, $\sigma_c$ represents the ionization cross section due to collision at the velocity $V_{rel}$, equal approximately to $10^{-16}$ cm$^2$, and $V_{rel}$ represents the relative velocity of the injected deuterium atoms in overtaking the tritons (already existing beam ions), equal to $4 \times 10^8$ cm/sec.

For a triton density $n_T$ equal to $10^{13}$ per cm$^3$, distance L equal to $10^5$ cm, and deuterium atom velocity of $1.2 \times 10^9$ cm/sec, the fraction $dn_D/n_D$ is:

$$dn_D/n_D = 10^{-16} \times 10^{13} \times 4 \times 10^8 \times 10^5/1.2 \times 10^9 \quad (36)$$
$$= 33$$

The preceding relation shows that essentially all of the injected deuterium atoms are ionized by collisions with beam tritons in the distance L/33 cm. Therefore essentially none of the injected deuterium atoms traverse the distance L before becoming ionized by collisions with the existing beam tritons.

The same calculation also applies to the injected tritium atoms, which are ionized by the existing deuterons of the beams.

Thus in steady-state operation, the injected and existing beams interact collisionally to ionize the neutral atoms during traversal of a fraction of the distance L.

Space-charge neutralization is important for intense ion beams, for example having a density of $10^{13}$ ions per cm$^3$ and higher. The electrons necessary for space-charge neutralization can be obtained from a variety of sources, such as ionization of residual background gas in the vacuum tube, 52, or from aluminum foils in the vicinity of the beam (but not intercepting the beam) that are irradiated with ultra-violet light, etc. For the present EXAMPLE I, the injection of neutral high-energy atoms, in both the start-up and steady-state modes of operation, automatically provides an equal number of ions and electrons after the ionization process has occurred. This is a consequence of the fact that a neutral atom of hydrogen consists of an ion and an electron; deuterium and tritium are isotopes of hydrogen, of course.

The net space charge need not be exactly zero; that is, the number of electrons per cm$^3$ need not be exactly equal to the number of ions per cm$^3$. A slight excess of positive charge permits the containment of electrons by the attraction of the positively-charged ion beam. Stated in alternative terms, the ion beams are constrained to follow the desired paths by the focusing action of the AG magnets, and the electrons are constrained to the desired regions by the attractive forces of the positively-charged ion beams.

The preceding description of the first embodiment of the present invention was concerned with the motion of the ion beams (deuterons and tritons), and the confinement of these beams by magnetic AG quadrupoles. The illustrative embodiment was based on the schematic drawing of FIG. 1, with AG magnets, 35 and 36.

Figure 4:
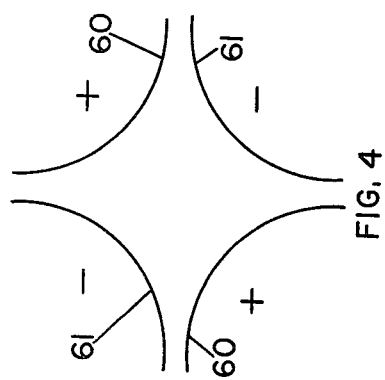
FIG. 4 shows a sketch of an electrical form of an alternating-gradient structure.

An alternative version of this first embodiment of the present invention can be based on alternating-gradient electrodes that are held at positive and negative potentials, as shown in FIG. 4. The potentials are constant in time for any given quadrupole.

The focusing forces for the electrostatic AG quadrupole of FIG. 4 arise from electric fields given by:

$$E_x = -K_e x \quad (37)$$

$$E_y = +K_e y \quad (38)$$

The adjacent electrostatic quadrupole has electrodes of opposite polarity, so that the corresponding electric fields are:

$$E_x = +K_e x \quad (39)$$

$$E_y = -K_e y \quad (40)$$

These alternating-gradient electric fields provide a net focusing force toward the z-axis, similar to the case of the magnetic quadrupoles.

The two preceding descriptions of the first embodiment of the present invention were based respectively on AG quadrupole magnets, FIGS. 2 and 3, and electrostatic fields, FIG. 4. It was pointed out that the theory of such AG focusing is well known in high-energy accelerator art. However, it is important to note that the present invention differs from the situation of a high-energy accelerator in that the ions have full energy at the time of injection. The design of quadrupole AG magnets for the purposes of the present invention involves essentially constant energy high-intensity beams that undergo Coulomb scattering and are not necessarily completely space-charge neutralized. Thus relatively large vacuum chambers and quadrupole field regions are required.

The specific requirement in regard to Coulomb scattering was disclosed in Section 4 of the NOVEL FEATURES OF INVENTION, where a calculation was given of the order-of-magnitude of the maximum scattering angle. In the laboratory frame of reference the maximum scattering angle was calculated to be 14 degrees for a deuteron having 1.5 Mev kinetic energy, and 9.5 degrees for a triton having 1.0 Mev kinetic energy. With the angle and energy of the deuterons and tritons specified, the AG quadrupole magnets can be designed by specialists in AG focusing, as developed in the high-energy accelerator art.

System characteristics are outlined next.

The following Table I summarizes the system characteristics for an illustrative versions of EXAMPLE I, for which calculations are given below.

The total path length around the machine, taken to have the form of a race-track as shown in FIG. 1, is equal to twice the length of the straight portion L ($=10^5$ cm), plus the circumference of a circle of radius R ($=100$ cm). The total path length is thus equal to $2.00628 \times 10^5$ cm. The radius of the total beam, consisting of the deuterons and tritons, is taken to be 3.00 cm. Thus the total beam volume is $5.673 \times 10^6$ cm$^3$.

In the steady-state regime, the density of the deuterons and the tritons in the beam is taken to be $10^{14}$ per cm$^3$ for each. The total number of deuterons in the machine is $5.673 \times 10^{20}$. The total number of tritons in the machine is also $5.673 \times 10^{20}$.

To fill the machine with this number of ions of each type, for an injection time of one second, requires a neutral beam "current" of deuterium atoms equal to $5.673 \times 10^{20}/6.242 \times 10^{18} = 90.881$ "amperes" (this represents the value of the current if the injected deuterium atoms were not neutral but ionized). Similarly, the neutral beam "current" of tritium atoms is equal to 90.881 "amperes".

The deuteron velocity is $12 \times 10^8$ cm/sec, the triton velocity is $8 \times 10^8$ cm/sec, so the relative velocity of the deuterons is $4 \times 10^8$ with respect to the tritons. At this relative velocity the fusion cross section, $\sigma_F$, is approximately $5 \times 10^{-24}$ cm$^2$. The energy release per fusion reaction is approximately 22.4 Mev, produced by DT fusion (17.6 Mev) plus wall reactions of the emitted neutron with lithium (4.8 Mev).

The fusion power produced per cm$^3$ of the beam is given by:

$$P_F/\text{cm}^3 = n_D n_T \sigma_F V_{rel}(22.4 \text{ Mev})/6.2418 \times 10^{18}) \quad (41)$$

$$= 71.77 \text{ watts/cm}^3 \text{ (thermal power)}$$

The total fusion power produced in the machine as heat is equal to the fusion power per cm$^3$ multiplied by the reacting volume; this is $71.77 \times 5.673 \times 10^6 = 4.0715 \times 10^8$ watts-thermal. The injected "current" of neutral deuterium atoms is obtained by dividing the watts-thermal by the energy release per DT fusion event (22.4 Mev), which is $4.0715 \times 10^8/22.4 \times 10^6 = 18.18$ equivalent "amperes". The injected "current" of neutral tritium atoms under steady-state conditions is also equal to 18.18 equivalent "amperes". This calculation assumes that no beam losses occur during the time for the fusion reactions; additional injected beam "current" would of course be necessary to compensate for such losses, the actual magnitude of which would need to be determined by construction and testing of the machine.

The fusion power, released as heat in the walls surrounding the vacuum chamber (or tube), must be converted into electrical form. A conventional conversion apparatus operating at overall efficiency of 40% is taken to be available, because such an apparatus is well known in the thermodynamic art. The electric power generated is thus $0.40 \times 4.0715 \times 10^8$ watts-electrical, which is $1.6286 \times 10^8$ watts-electrical.

The input beam power in steady-state is given by the "current" 18.18 "amperes" multiplied by the kinetic energy of the deuterium and tritium atoms, $1.0 + 1.5$ Mev; this is $18.18(2.5 \times 10^6)$ watts $= 4.545 \times 10^7$ watts. This beam power is taken to be produced at 80% efficiency, so the beam input power is $4.545 \times 10^7/0.80 = 5.6813 \times 10^7$ watts. To be conservative, additional losses in the magnets (consisting of permanent magnets plus electromagnets), and other unavoidable losses, are taken to be equal to the beam input power. Thus the net electrical power produced is equal to $1.6286 \times 10^8 - 2 \times 5.6813 \times 10^7 = 4.92 \times 10^7$ watts electrical. This is about one-tenth of the fusion thermal power, but adequate.

TABLE I

| | |
|---|---|
| $L = 1.00 \times 10^5$ cm | Machine length |
| $R = 1.00 \times 10^2$ cm | Machine radius |
| $r = 3.00$ cm | Beam radius |
| $\text{Vol} = 5.67 \times 10^6$ cm$^3$ | Machine reaction volume |
| $n_D = 1.00 \times 10^{14}$ cm$^{-3}$ | Deuterons per cm$^3$, steady-state |
| $n_T = 1.00 \times 10^{14}$ cm$^{-3}$ | Tritons per cm$^3$, steady-state |
| $V_D = 1.20 \times 10^9$ cm/sec | Deuteron velocity, laboratory frame |
| $V_T = 8.00 \times 10^8$ cm/sec | Triton velocity, laboratory frame |
| $V_{rel} = 4.00 \times 10^8$ cm/sec | $V_D$-$V_T$, laboratory frame |
| $\sigma_F = 5.00 \times 10^{-24}$ cm$^2$ | Fusion cross section |
| $j_D = 1.92 \times 10^4$ amp/cm$^2$ | Deuteron current density, $n_D V_D/C$ |
| $j_T = 1.28 \times 10^4$ amp/cm$^2$ | Triton current density, $n_T V_T/C$ |
| $C = 6.24 \times 10^{18}$ | Conversion factor, charges per second converted to amperes |
| $I_D = 5.44 \times 10^5$ amperes | Deuteron current in beam |
| $I_T = 3.62 \times 10^5$ amperes | Triton current in beam |
| $P_F/\text{cm}^3 = 7.18 \times 10^1$ w/cm$^3$ | Fusion thermal power, watts/cm$^3$ |
| $P_{Ft} = 4.07 \times 10^8$ watts | Total fusion power, watts-thermal |
| $P_{Fe} = 1.63 \times 10^8$ watts | Fusion power, watts-electrical |
| $P_B = 4.55 \times 10^7$ watts | Injected beam power, watts, steady |
| $P_E = 4.92 \times 10^7$ watts | Net electrical output power, watts |
| $N_D = 5.67 \times 10^{20}$ | Number of deuterons in reaction vol. |
| $N_T = 5.67 \times 10^{20}$ | Number of tritons in reaction volume |
| $C_D = 9.09 \times 10^1$ coul. | Coulombs of deuterons in volume |
| $C_T = 9.09 \times 10^1$ coul. | Coulombs of tritons in reaction vol. |
| $W_S = 2.27 \times 10^8$ joules | Plasma energy in reaction volume |
| $I_B = 9.06 \times 10^5$ amperes | Beam current (D plus T currents) |
| $\theta_D = 1.40 \times 10^1$ degrees | Max. scattering angle, deuterons |
| $\theta_T = 9.50 \times 10^0$ degrees | Max. scattering angle, tritons |

TABLE I-continued $P_L = 2.00 \times 10^4$ watts/cm²    Laser power per cm² for start-up The preceding calculation and TABLE I gives values for an illustrative version of the present invention, EXAMPLE I, based on alternating-gradient magnets to confine deuteron and triton beams. To conclude the description of EXAMPLE I, a very important advantage of the present invention should be considered, namely the stability of the plasma.

In all present-day fusion experiments, it is well known that the energy invested in the plasma is lost by a variety of processes long before it is replaced by fusion-reaction energy. Analysis of the various causes for such plasma and energy losses would be inappropriate here. Instead, reasons for the stability of the plasma in the present invention are now discussed.

The intense deuteron and triton beams have considerable momentum, very much larger than the momentum of the electrons that are necessary for space-charge neutralization. Consequently, no forces are available to deflect the ion beams from the axis of the machine.

The ion beams are constrained to follow the desired trajectory by the AG magnets; the electrons are attracted by the positive charge of the ions, so that the net space charge is essentially zero; i. e., the plasma is essentially neutral. The interaction of the ion beams with the neutralizing electrons causes the latter to become heated, and some of the electrons therefore escape. However, this produces a net potential (and electric field) on the plasma consisting of the ion beams and electrons, so that the potential of the plasma is approximately equal to the temperature of the electrons expressed in electron-volts.

The thermal motion of the electrons of the plasma does not produce a significant current. However, the deuteron and triton beams, for the illustrative example, total $9.06 \times 10^5$ amperes at a radius of 3 cm, which produce a magnetic field of $6.11 \times 10^4$ gauss. This magnetic field serves to contain the neutralizing electrons, and also to contain deuterons and tritons that have accumulated deviations from the axis via Coulomb scattering. This confining effect of the ion beams was previously discussed in Section 2 of NOVEL FEATURES OF INVENTION.

The thermal motion of the electrons may correspond to an electron temperature of $10^4$ electron-volts. For such a temperature the root-mean-square velocity is about $6 \times 10^9$ cm/sec, and the radius of gyration is about $5 \times 10^{-3}$ cm in the magnetic field produced by the deuteron and triton beams ($6.11 \times 10^4$ gauss). The electrons are effectively trapped by the magnetic field of the deuteron and triton beam currents.

The exact value of the electron temperature is not easy to calculate because various assumptions are necessary. However, the knowledge of the exact value of the electron temperature is not required in order to design the AG magnets; the design has been discussed previously.

The magnetic field of the beam currents, for the conditions in the illustrative example, is sufficiently intense to confine the individual deuterons and tritons. For the maximum lateral motion of a deuteron (lateral velocity of $2.4 \times 10^8$ cm/sec), and the magnetic field of $6.11 \times 10^4$ gauss, the radius of gyration of the deuteron is 0.82 cm. With motion in the axis-direction included, the deuteron having an angle of 15 degrees (with respect to the axis) is deflected back to the axis after moving less than half a centimeter in the direction perpendicular to the axis.

The confinement of intense beams with AG magnets is clearly difficult to calculate exactly, because the self-fields of the beam currents must be included, as well as the focusing forces of the AG magnets. However, the conservative approach to AG magnet design can be based on "zero-help" from the beam self-fields.

EXAMPLE II: EMBODIMENT WITH AG MAGNETS AND TURNING-MAGNETS

The preceding EXAMPLE I was an illustrative embodiment of the present invention, employing alternating-gradient (AG) magnets for confinement of the deuteron and triton beams, in both the straight and curved portions of the trajectory.

The present EXAMPLE II is an illustrative embodiment of the present invention, employing AG magnets for confinement of the deuteron and triton beams in the straight portion of the path, and magnets at the ends to turn the beams around.

As in the case of EXAMPLE I, the present illustrative example employs magnetic fields that are effective in confining beams of charged particles, but not stationary plasmas. Thus a clear distinction can be drawn between the present invention and existing approaches.

Figure 5:
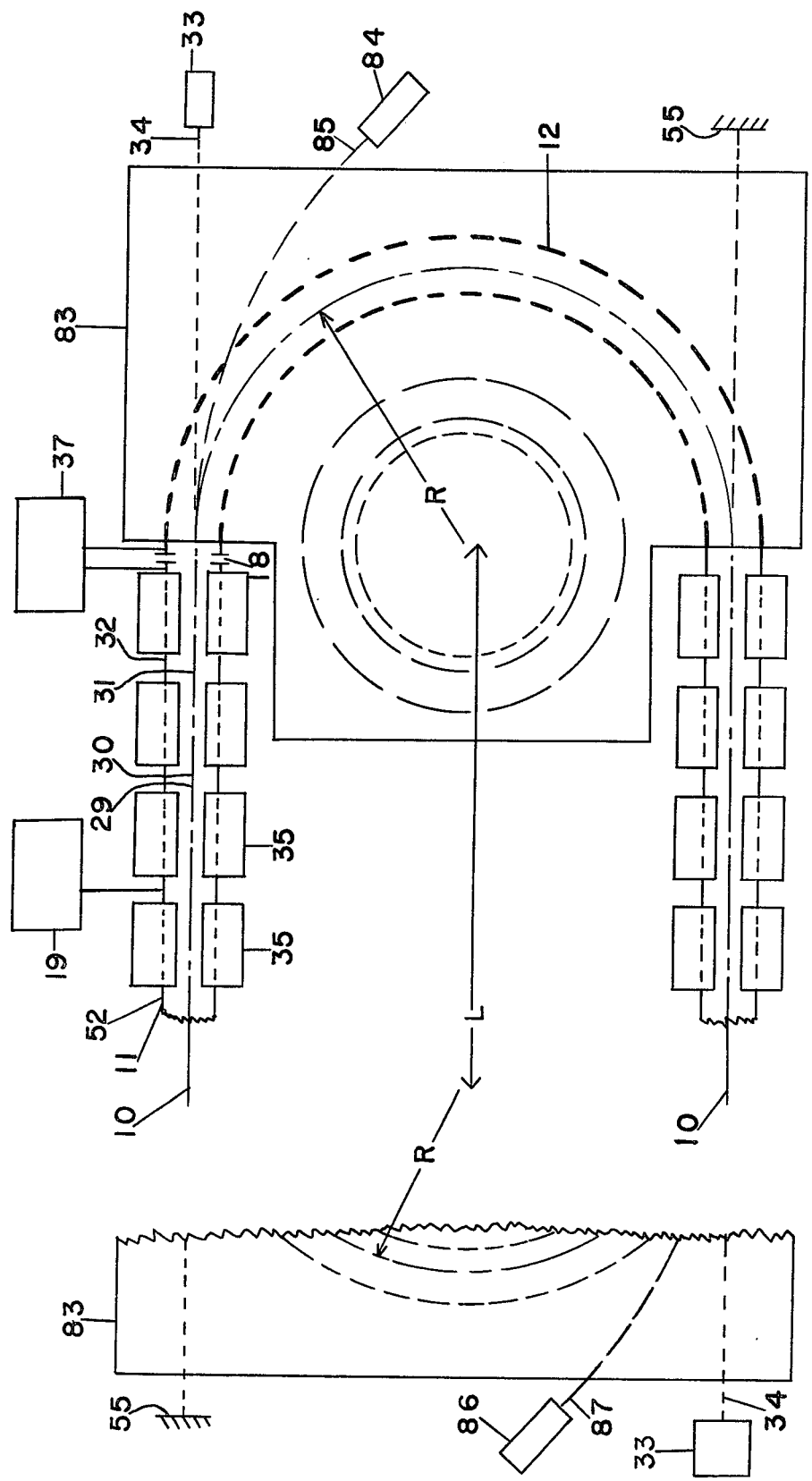
FIG. 5 is a sketch of the component parts of a system using "alternating-gradient" magnets in the essentially straight portion of the path, and "cyclotron-type" turning magnets at the ends, together with vacuum chamber, injection and trapping apparatus, and other related items.
Figure 6:
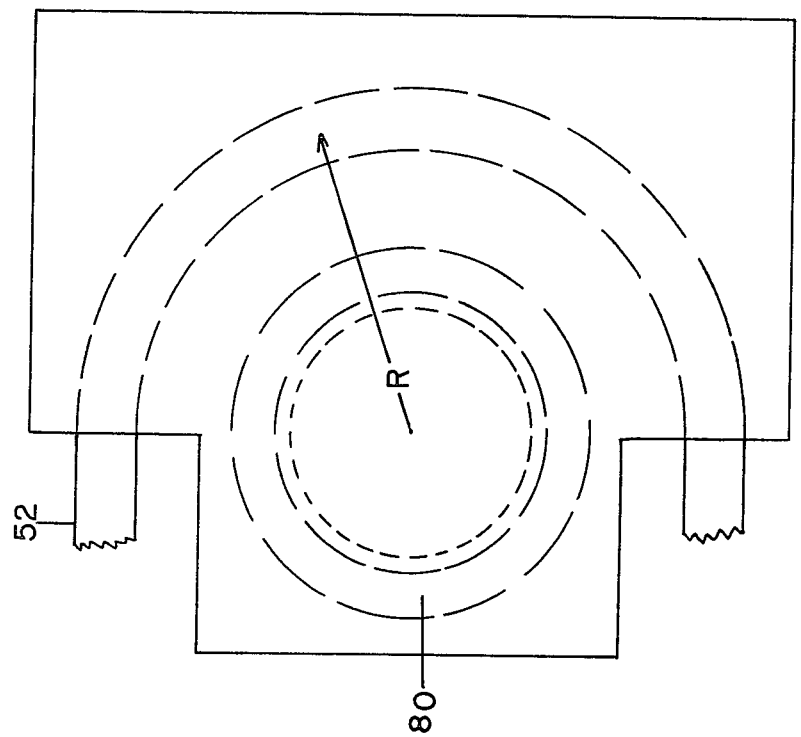
FIG. 6 shows a sketch of the "cyclotron-type" magnet that is used for the turning-magnet at the ends of the system.
Figure 6:
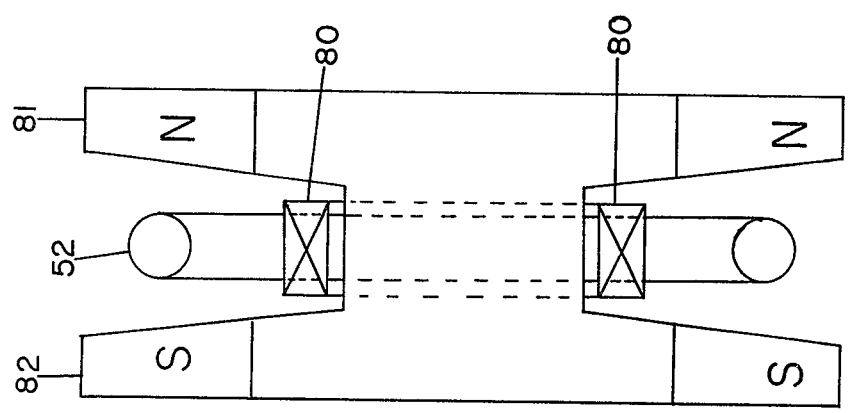

The illustrative embodiment of the present invention of EXAMPLE II is shown in the schematic drawings of FIGS. 5 and 6. FIG. 5 is intended to show the beam paths of the fusible particle beams (i. e., deuterons and tritons), and the magnets that control the paths of the beams. The apparatus has a central axis, 10, that resembles a race-track, namely a long straight path of length L (typically of the order of a few kilometers), and turning-magnets at the ends having a radius of curvature R (typically of the order of one meter).

In FIG. 5, the magnets, 35, provide guide magnetic fields to maintain an approximately straight line path for the ion beams, for the length L. These magnets, 35, have the purpose, design, and characteristics already explained in connection with FIG. 1, of EXAMPLE I, so no further description of them is necessary.

In FIG. 5, the end magnets, 83, are employed in place of the magnets, 36, of FIG. 1, to provide guide magnetic fields to maintain essentially semi-circular paths for the ion beams. The end-magnets can also be termed "turning-magnets" because their function is to reverse the direction of the beams at each end of the system, so that the paths are repeated. As shown in FIG. 6, the turning-magnets consist of a north (N) pole, 81, and a south (S) pole, 82, energized by a coil, 80. The vacuum chamber, 52, is positioned symmetrically between the N and S poles, and has an axis of radius R.

The pole faces, 81 and 82, are tapered, to provide a field index $n = -0.5$ approximately, in accordance with the definition and equation previously given, Eq. 32. As is well known in the high-energy accelerator art, such tapered pole faces provide focusing action in both the horizontal and vertical planes. Although the turning-magnets of FIGS. 5 and 6 provide only "weak focusing," the length of the path in the curved portion ($2\pi R$) is very much smaller than the path length in the straight portion ($2L$), so the "weak focusing" is adequate to maintain the desired beam paths.

This concludes the description of the magnets, 35 and 83, of FIG. 5, which provide focusing forces on the beams along the axis, 10, of the system.

A vacuum enclosure, 52, consisting of a conducting wall that is straight, 11, and curved, 12, maintains the beam path free from external gases, by means of the vacuum pump, 19. An insulated section in the enclosure wall, 18, permits a current supply, 37, to produce a wall current, 32, equal and opposite to the net beam current, 31, flowing along the axis. The deuteron current, 29, and triton current, 30, add to produce the net beam current, 31.

To place the system in operation, an initial start-up procedure is necessary, followed by steady-state operation. An illustrative version is now described for the start-up regime.

An accelerator, 84, produces a beam of high-energy (3.0 Mev approximately) $D_2^+$ ions, 85, directed so that the radius of curvature brings the 3.0 Mev $D_2^+$ ion on the axis, 10, at the entry portion of the magnet, 35. Similarly another accelerator, 86, produces a beam of high-energy (2.0 Mev approximately) $T_2^+$ ions, 87, directed so that the radius of curvature brings the 2.0 Mev $T_2^+$ ion on the axis, 10. Because of limited space, FIG. 5 does not show the magnet, 35, into which the $T_2^+$ beam enters, but the path is obvious from symmetry with the $D_2^+$ beam and the preceding description.

As depicted in FIG. 5, the direction of the injected beam is counter-clockwise as seen from above, for both $D_2^+$ and $T_2^+$ beams. During the traversal of the length L, the injected molecular-ion beams are irradiated by laser beams, 34, from lasers, 33. The laser beam photons cause dissociation of the molecular ions (3.0 Mev) into the constituents, namely the neutral atom, $D^0$ (1.5 Mev), and $D^+$ (1.5 Mev) ion. The neutral atom is subsequently ionized into an ion and an electron. Expressed mathematically, the process is, with p representing a laser-beam photon and $e^-$ representing an electron:

$$p + D_2^+(3.0 \text{ Mev}) \rightarrow D^0(1.5 \text{ Mev}) + D^+(1.5 \text{ Mev}) \quad (41)$$

$$p + D^0(1.5 \text{ Mev}) \rightarrow D^+(1.5 \text{ Mev} - 400 \text{ ev}) + e^-(400 \text{ ev}) \quad (42)$$

$$p + T_2^+(2.0 \text{ Mev}) \rightarrow T^0(1.0 \text{ Mev}) + T^+(1.0 \text{ Mev}) \quad (43)$$

$$p + T^0(1.0 \text{ Mev}) \rightarrow T^+(1.0 \text{ Mev} - 180 \text{ ev}) + e^-(180 \text{ ev}) \quad (44)$$

Equation 41, for example, shows the dissociation of the $D_2^+$ molecular ion having nominally 3.0 Mev kinetic energy into a neutral atom, $D^0$ having 1.5 Mev kinetic energy, and an ion, $D^+$ having 1.5 Mev kinetic energy. Equation 42 shows the ionization of the deuterium atom having 1.5 Mev kinetic energy into an ion, $D^+$ having 1.5 Mev less the 400 ev kinetic energy of the electron, and the electron, $e^-$ having 400 ev of the kinetic energy. Equations 43 and 44 show similar reactions for the triton molecular ion, $T_2^+$ and the tritium atom, $T^0$.

The result of the laser action is the production of deuterons having 1.5 Mev of kinetic energy, approximately, and of tritons having 1.0 Mev of kinetic energy, approximately. Because the deuterons and tritons have essentially the same momentum and charge they traverse the same path (namely, the axis of the machine). The velocity of the deuterons is in the same direction as the velocity of the tritons at any place on the axis; however, the deuterons overtake the tritons at the relative velocity such that the fusion cross section is near the peak value.

The injection of the high-energy molecular ions continues until the density of the ions (deuterons and tritons) reaches or exceeds approximately $10^{13}$ ions per $cm^3$. With this density of ions per $cm^3$, a new regime is reached, which can be termed "steady-state" operation.

To operate the system in steady-state condition, the lasers are not needed. The high-energy molecular ions are injected, as described above, and subsequently become ionized by collisions with the existing beam ions, during traversal of the length L along the axis of the machine. The injected molecular $d_2^+$ ions overtake the existing beam tritons and collide, producing dissociation and then ionization. Similarly, injected molecular $T_2^+$ ions are overtaken by existing beam deuterons, producing dissociation and then ionization.

The dissociation of the molecular ions within the machine (and subsequent ionization of the neutral atom) produced "trapping" of the ions in the form of circulating beams. Thus a moderate input current of molecular ions permits the attainment of intense beams of circulating ions.

The system characteristics of EXAMPLE I are essentially identical with the system characteristics of EXAMPLE II, as shown in TABLE I, which applies to both examples.

EXAMPLE III: EMBODIMENT WITH SOLENOID

The present EXAMPLE III is an illustrative embodiment of the present invention, employing a long solenoid in the form of a racetrack. The apparatus has a central axis, 10, that resembles a race-track, namely a long straight path of length L (typically of the order of a few kilometers), and curved end regions having a radius of curvature R (typically of the order of one meter).

Figure 7:
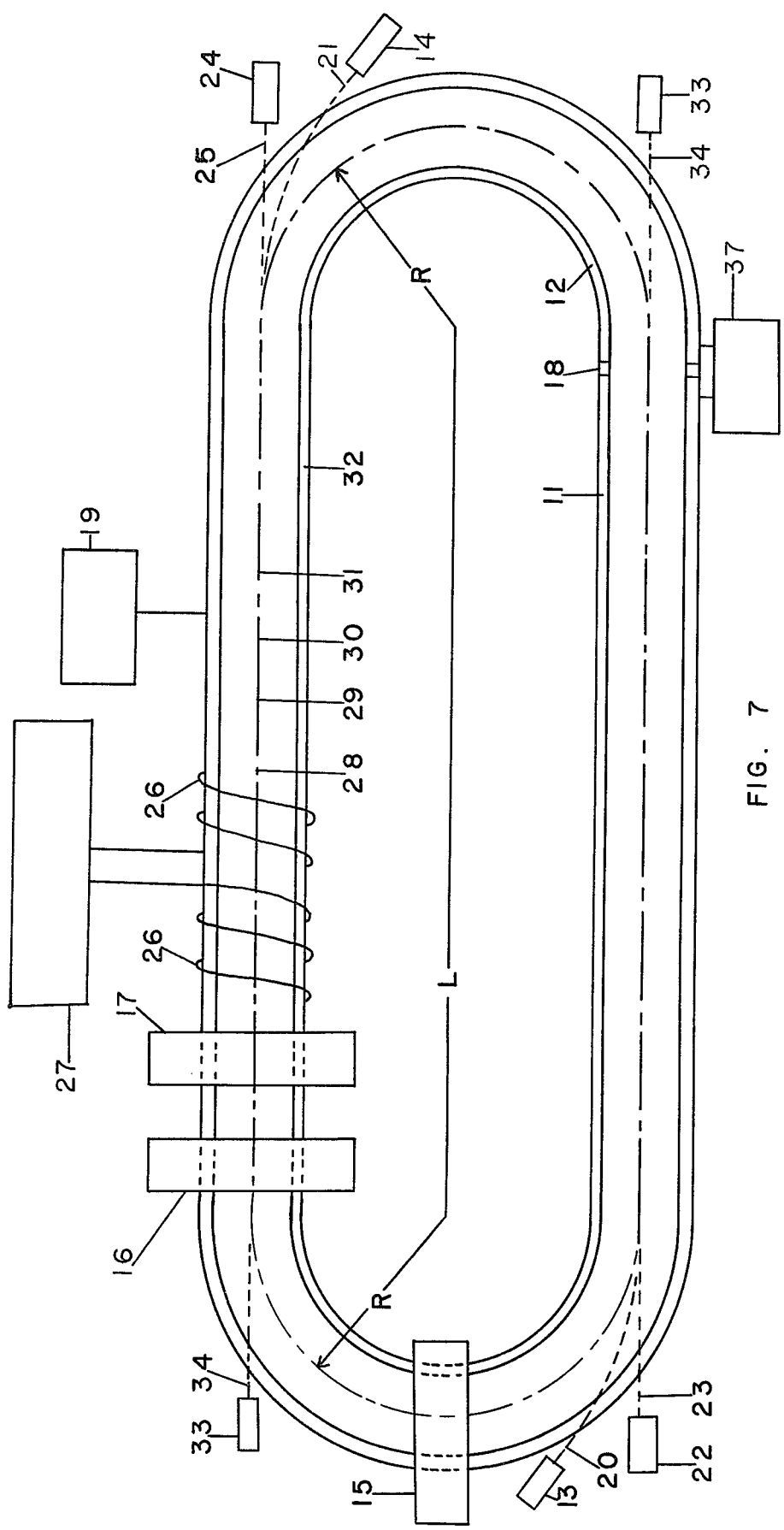
FIG. 7 is a sketch of the component parts of a system using solenoid windings on the surface of a vacuum chamber, injection and trapping apparatus, and other related items, including induction magnets.

In FIG. 7, solenoid windings, 26, are positioned continuously on the vacuum chamber, 52. These solenoid windings are distributed uniformly along the length L and along the essentially semicircular end regions. The solenoid windings are energized by the magnetic field power supply, 27, to produce a magnetic field, $B_s$, designated 28, that is directed along the axis, 10, of the machine. A vacuum pump, 19, attached to the vacuum chamber, 52, maintains the beam path free from external gases. An insulated section in the enclosure wall, 18, permits a current supply, 37, to produce a wall current, 32, equal and opposite to the net beam current, 31, flowing along the axis. The deuteron current, 29, and triton current, 30, add to produce the net beam current, 31.

To place the system in operation, an initial start-up procedure is necessary, followed by steady-state operation. As has already been explained in connection with the preceding EXAMPLES I and II, either high-energy neutral injection or high-energy molecular-ion injection (or a combination of both) can be employed, with a laser to serve as the dissociating and ionizing means. For high-energy neutrals, the energies are 1.5 Mev for deuterium atoms, and 1.0 Mev for tritium atoms. For high-energy molecular ions, the energies are 3.0 Mev for $D_2^+$ molecular ions, and 2.0 Mev for $T_2^+$ molecular ions.

After the ion density reaches approximately $10^{13}$ ions/$cm^3$ or more, the laser beam is no longer needed, and the change-of-charge state can be achieved by collisions between existing beams and the injection particles. The procedures have already been described in the preceding EXAMPLES I and II, and are not repeated here.

In FIG. 7 the lasers are identified by the numbers 33 and the laser beams by 34; the $D_2^+$ source by 13; the $T_2^+$ source by 14; the $D_2^+$ injected ion beam by 20; the $T_2^+$ injected ion beam by 21; the $D^0$ source and injected beam by 22 and 23; the $T^0$ source and injected beam by 24 and 25; the deuteron beam current along the axis of the machine by 29; the triton beam current along the axis of the machine by 30; and the sum of the deuteron and triton beam currents along the axis of the machine by 31. The wall current, 32, is equal and opposite to the net beam current, 31.

Figure 8:
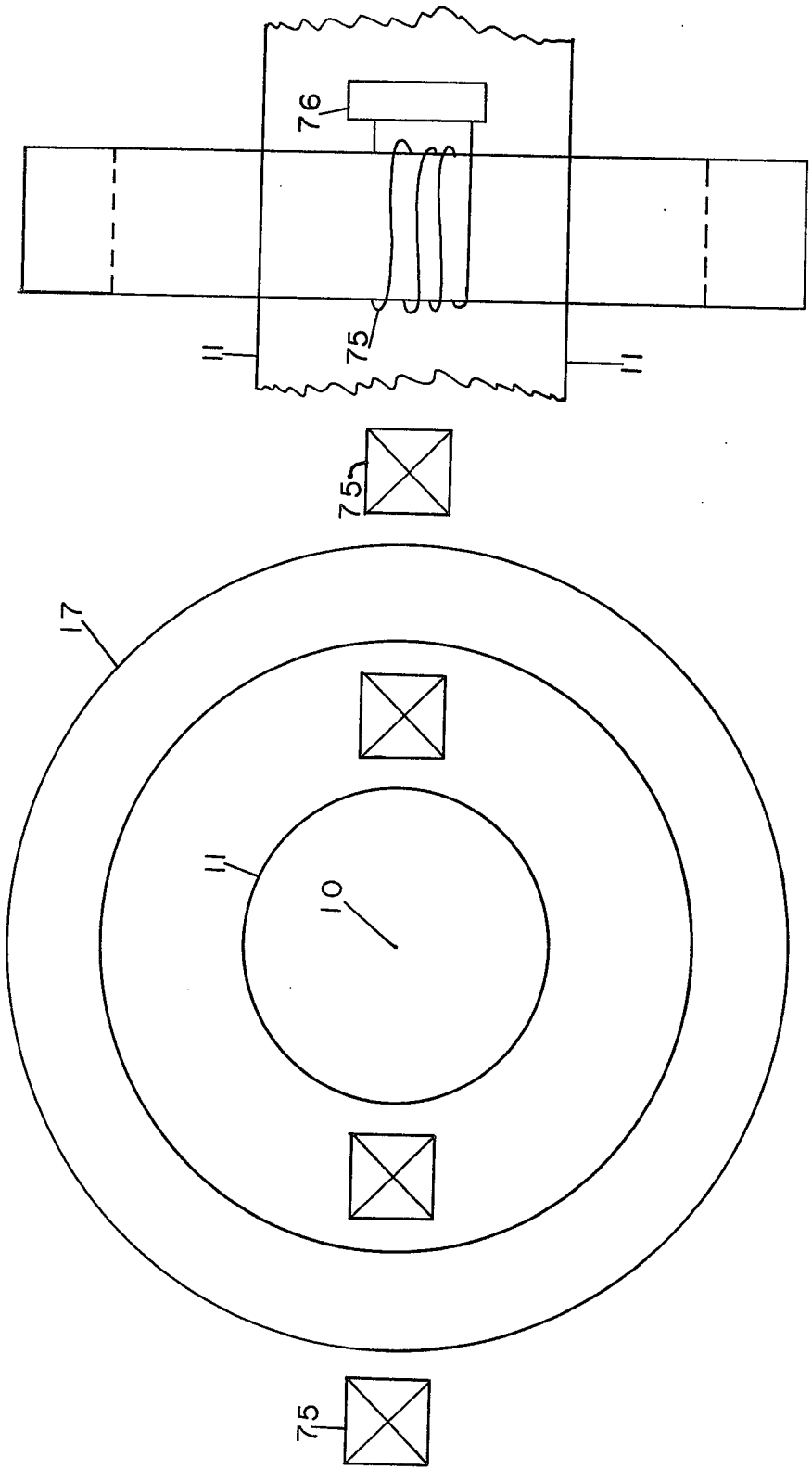
FIG. 8 is a sketch of the induction magnet of FIG. 7.

Induction electromagnets, 15, 16, and 17 are distributed coaxially with the machine axis, 10, to produce accelerating or decelerating electric fields, so as to increase or decrease the ion kinetic energy. Although induction electromagnets are well known in the high-energy accelerator art, FIG. 8 is a reference sketch showing the doughnut-shaped core, 17, consisting of material having high permeability (such as soft iron), and energizing coils, 75, connected to a power supply, 76. The vacuum enclosure wall, 11, is shown, and also the axis of the machine, 10.

The confining magnetic field in the present EXAMPLE III is quite different from that of EXAMPLE I or II. However, the values in TABLE I apply to the present case, as illustrative of the performance capabilities of this embodiment.

The specific requirement in regard to Coulomb scattering was disclosed in Section 4 of the NOVEL FEATURES OF INVENTION, where a calculation was given of the order-of-magnitude of the maximum scattering angle. In the laboratory frame of reference the maximum scattering angle was calculated to be 14 degrees for a deuteron having 1.5 Mev kinetic energy, and 9.5 degrees for a triton having 1.0 Mev kinetic energy. Confinement of such ions (having the maximum scattering angle) can be achieved in the magnetic field, $B_s$, produced by the solenoid windings. Thus the injected deuterons and tritons interact by overtaking collisions, while maintaining the directed-beam character, until fusion reactions have been completed.

The electrons that are necessary for space-charge neutralization can be obtained from the incident particle in the case of neutral atom injection, or from residual gas ionization in the case of molecular ion injection.

The fusion power, released as heat in the walls surrounding the vacuum chamber (or tube), must be converted into electrical form. The procedure and calculations for this have already been described in connection with EXAMPLE I and are not repeated here.

As was stated earlier, some of the magnetic field configurations may appear to have a superficial resemblance to existing systems. However, the novel features (five of them, described before EXAMPLE I) are present in the present embodiment, and so these, together with the magnetic field configuration of FIG. 7 represent a new and novel embodiment of the invention. Specifically in the present embodiment with solenoids to produce the magnetic field (whose axis is in the direction of the ion velocity), the deuterons overtake the tritons at a relative velocity which produces a high fusion reaction cross section. Second, the beam currents of the deuterons and tritons are additive. Third, the momentum of the deuterons is equal to the momentum of the tritons. Fourth, the repeated Coulomb collisions between the beams of deuterons and tritons produces deflections that are less than 15 degrees. Fifth, the induction magnets, 15, 16, and 17, and others similar but not shown, permit removal of kinetic energy from the beams when desired.

EXAMPLE IV: EMBODIMENT WITH FIGURE-EIGHT SOLENOID

The present EXAMPLE IV is an illustrative embodiment of the present invention, employing a long solenoid in the form of a "figure-8". The arrangement is essentially similar to the preceding EXAMPLE III, except that the solenoid has a different shape, resembling an "8" rather than a "race-track".

Figure 9:
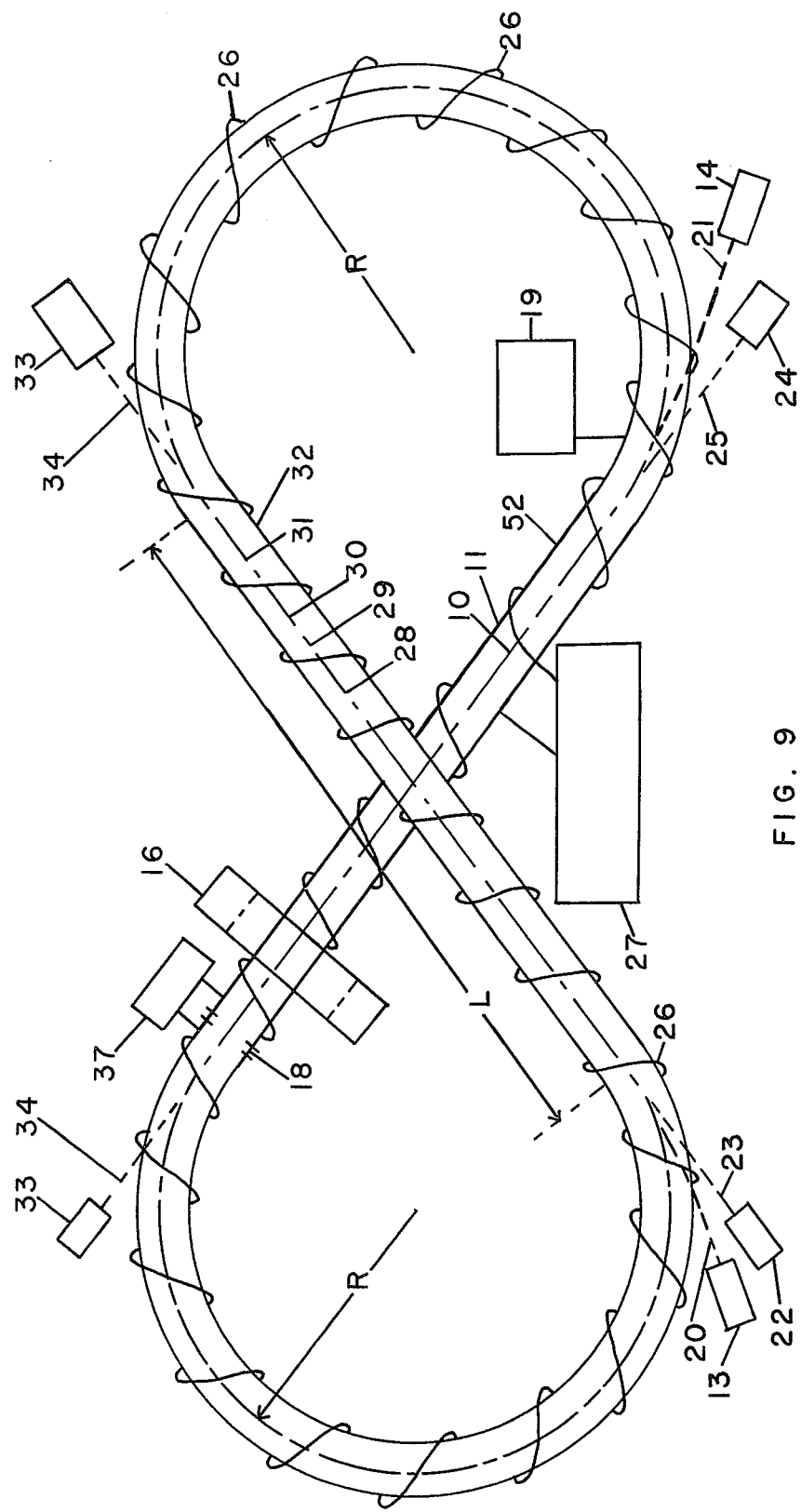
FIG. 9 is a sketch of the solenoid windings on the surface of a vacuum chamber, arranged in a "figure-eight" configuration, together with other related items.

FIG. 9 illustrates the "figure-8" version of the present invention. The central axis, 10, has a long straight path L, 11, (typically of the order of a few kilometers in length), and curved end regions, 12, approximating a semi-circle having a radius of curvature R (typically of the order of one meter).

In FIG. 9, solenoid windings, 26, are positioned continuously on the vacuum chamber, 52. These solenoid windings are distributed uniformly along the length L and along the essentially semicircular end regions. The solenoid windings are energized by the magnetic field power supply, 27, to produce a magnetic field, $B_s$, designated 28, that is directed along the axis of the machine, 10. A vacuum pump, 19, attached to the vacuum chamber, 52, maintains the beam path free from external gases. An insulated section in the enclosure wall, 18, permits a current supply, 37, to produce a wall current, 32, equal and opposite to the net beam current, 31, flowing along the axis. The net beam current, 31, consists of the deuteron current, 29, and the triton current, 30, which flow in the same direction along the axis, 10, of the machine.

To place the system in operation, an initial start-up procedure is necessary, followed by steady-state operation. As has already been explained in connection with the preceding EXAMPLES I, II, and III, either high-energy neutral injection or high-energy molecular-ion injection (or a combination of both) can be employed, with a laser to serve as the dissociating and ionizing means. For high-energy neutrals, the energies are 1.5 Mev for deuterium atoms, and 1.0 Mev for tritium atoms. For high-energy molecular ions, the energies are 3.0 Mev for $D_2^+$ molecular ions, and 2.0 Mev for $T_2^+$ molecular ions.

After the ion density reaches approximately $10^{13}$ ions/cm$^3$ or more, the laser beam is no longer needed, and the change-of-charge state can be achieved by collisions between existing beams and the injected particles. The procedures have already been described in the preceding EXAMPLES I and II, and are not repeated here.

In FIG. 9 the lasers are identified by the numbers 33; the laser beams by 34; the $D_2^+$ source by 13; the $T_2^+$ source by 14; the $D_2^+$ injected beam by 20; the $T_2^+$ injected ion beam by 21; the $D^0$ source and injected beam by 22 and 23; the $T^0$ source and injected beam by 24 and 25; the deuteron beam current along the axis of the machine by 29; the triton beam current along the axis of the machine by 30; and the sum of the deuteron and triton beam currents along the axis of the machine by 31. The wall current, 32, is equal and opposite to the net beam current, 31.

Induction electromagnets are distributed coaxially with the machine axis, 10, to produce accelerating or decelerating electric fields, so as to increase or decrease the ion kinetic energy. Only one induction electromagnet, 16, is shown in FIG. 9, in the interest of simplicity.

The induction electromagnets can be used to remove energy from the ion beams if desired. They need not be used, if the beams are allowed to interact until all of the ions have been consumed in fusion reactions. The reference sketch, FIG. 8, shows the construction of the induction electromagnets, as previously explained in connection with EXAMPLE III.

The electrons that are necessary for space-charge neutralization can be obtained from the incident particle in the case of neutral atom injection, or from residual gas ionization in the case of molecular ion injection.

EXAMPLE V: EMBODIMENT WITH SOLENOID AND TURNING-MAGNETS

Figure 10:
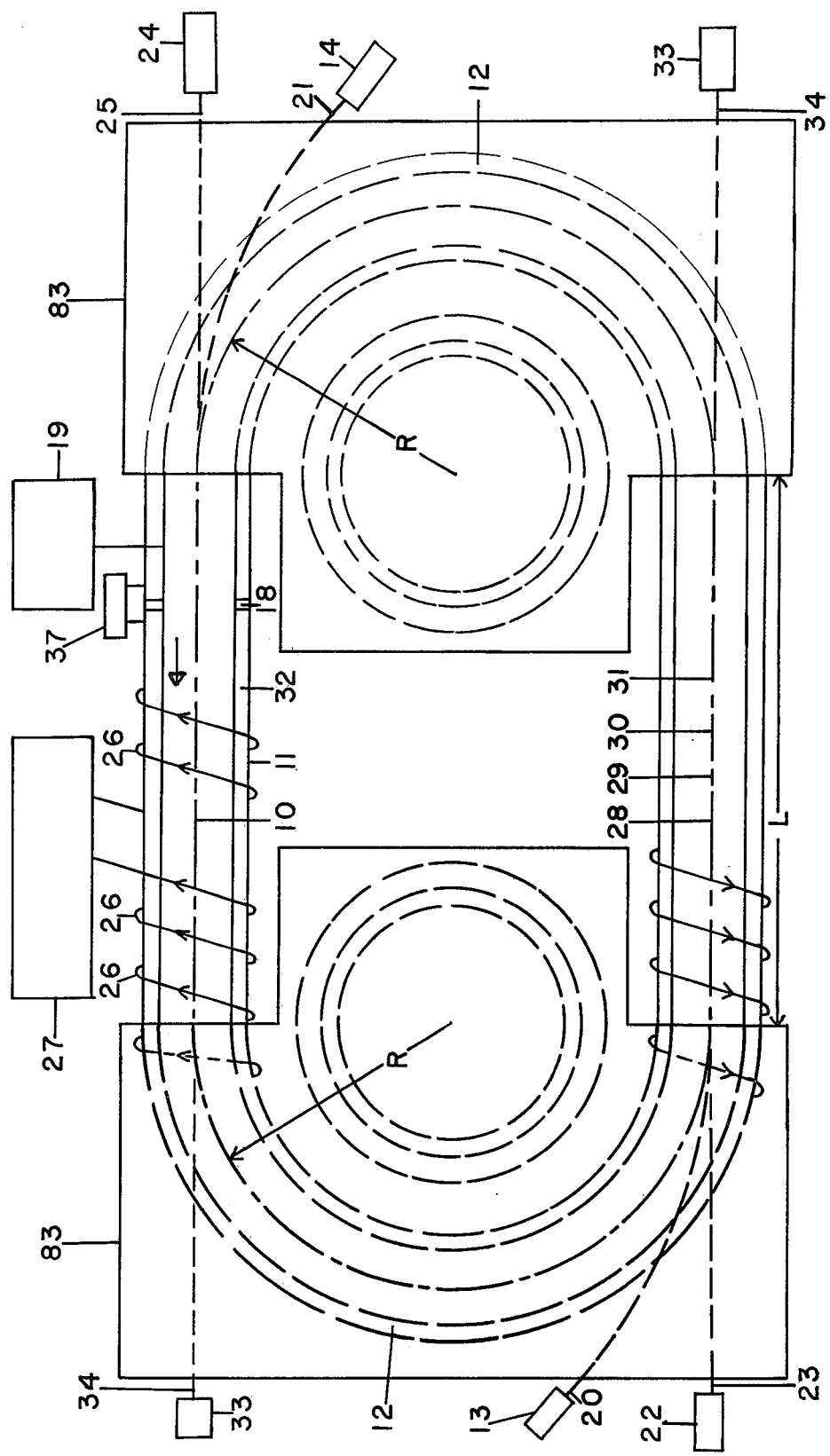
FIG. 10 is a sketch of the component parts of a system using solenoid windings on the surface of a vacuum chamber, at the ends of which are "cyclotron-type" turning magnets, plus other related items.

The present EXAMPLE V is an illustrative embodiment of the present invention, employing a long solenoid (in the form of a "race-track" or in the form of a "figure-8"), with turning-magnets at each end. In the interests of simplicity, the "race-track" shaped solenoid and end magnets are shown in FIG. 10. The "figure-8" shaped solenoid and end magnets can also be used as an embodiment of the present invention. It is not shown because the sketch would be cumbersome to draw, and the construction is evident from the disclosure of FIG. 10.

The apparatus has a central axis, 10, that resembles a racetrack in FIG. 10 (or a figure-8, not shown), namely a long straight path of length L, 11, typically of the order of a few kilometers, and curved end regions having a radius of curvature R, 12, of the order of one meter, typically.

In FIG. 10 solenoid windings, 26, are positioned continuously on the vacuum chamber, 52. These solenoid windings are distributed uniformly along the length L and along the essentially semicircular end regions. The solenoid windings are energized by the magnetic field power supply, 27, to produce a magnetic field, $B_s$, designated 28, that is directed along the axis, 10, of the machine. A vacuum pump, 19, attached to the vacuum chamber, 52, maintains the beam path free from external gases. An insulated section in the enclosure wall, 18, permits a current supply, 37, to produce a wall current, 32, equal and opposite to the net beam current, 31, flowing along the axis. The deuteron current, 29, and triton current, 30, add to produce the net beam current, 31.

The end magnets, 83, provide magnetic fields to cause the ion beams to follow essentially semi-circular paths. The end magnets can also be termed "turning-magnets" because their function is to reverse the direction of the beams at each end of the system, so that the paths are repeated. As shown in FIG. 6, the turning-magnets consist of a north (N) pole, 81, and a south (S) pole, 82, energized by a coil, 80. The vacuum chamber, 52, is positioned symmetrically between the N and S poles, and has a radius R as shown in FIG. 6, with regard to the semi-circular path.

The pole faces, 81 and 82, are tapered, to provide a field index $n = -0.5$ approximately, in accordance with the definition and equation previously given, Eq. 32.

Although the race-track-shaped solenoid (or alternatively the figure-8-shaped solenoid) can serve to confine the ion beams, and to reverse the beam direction at the ends, the addition of turning-magnets aids in the beam-direction reversal, and causes the beam paths to follow more precisely the same path in successive passages around the machine.

To place the system in operation, an initial start-up procedure is necessary, followed by steady-state operation. An illustrative version is now described for the start-up regime.

An accelerator, 13, produces a beam of high-energy (3.0 Mev approximately) $D_2^+$ ions, 20, directed so that the radius of curvature brings the ion on the axis, 10, at the face of the turning-magnet. Similarly, another accelerator, 14, produces a beam of high-energy (2.0 Mev approximately) $T_2^+$ ions, 21, directed so that the radius of curvature brings the ion to the axis, 10, at the face of the turning-magnet. Alternatively (or additionally) high-energy neutral beams can be injected; a source, 22, of neutral $D^0$ atoms, 23, having approximately 1.5 Mev injects the beam along the axis, 10, of the machine; also, a source, 24, of neutral $T^0$ atoms, 25, having approximately 1.0 Mev injects the beam along the axis, 10, of the machine. These injected beams are dissociated and ionized by laser beams during traversal of the length L. The lasers, 33, produce beams, 34, along the axis, 10.

After the ion density reaches approximately $10^{13}$ ions/cm$^3$, or more, the laser beam is no longer needed, and the change-of-charge state can be achieved by collisions between existing beams and the injected particles. Such procedures have already been described in the preceding EXAMPLES I and II, and are not repeated here.

The novel features in the present embodiment should be noted. First, the deuterons overtake the tritons at a relative velocity which produces a high fusion reaction cross section. Second, the beam currents of the deuterons and tritons are additive, which produces a magnetic field that helps to confine the ions and the space-charge neutralizing electrons. Third, the momentum of the deuterons is equal to the momentum of the tritons; this means that both types of ions are affected in the same way by the turning-magnets at the ends of the machine. (No other existing or proposed fusion system has this feature). Fourth, the repeated Coulomb collisions between the beams of deuterons and tritons produces deflections that are less than 15 degrees. Fifth, induction magnet arrays can permit removal of kinetic energy from the beams when desired; these induction magnets were described and discussed in connection with previous EXAMPLES, and are not included in FIG. 10 to avoid making the drawing too complicated.

The system characteristics for the present embodiment are essentially those given in TABLE I.

The electrons that are necessary for space-charge neutralization can be obtained from the incident particles in the case of neutral atom injection, or from residual gas ionization in the case of molecular ion injection.

The fusion power, released as heat in the walls surrounding the vacuum chamber (or tube), must be converted into electrical form. The procedure and calculations for this have already been described in connection with EXAMPLE I and are not repeated here.

I claim the following:

1. In an apparatus for nuclear fusion of the type having:
   a. elongated vacuum chamber means with connecting end portions so as to provide an evacuatable containment volume; said chamber having an axis of symmetry;
   b. vacuum pump means communicating with said vacuum chamber so as to maintain a gas pressure less than $10^{-3}$ torr within the vacuum chamber;
   c. means for producing magnetic fields so that said magnetic fields are present substantially throughout said vacuum chamber and are re-entrant on themselves; an improved particle-injection apparatus comprising:

d. means for injecting fusible energetic particles having a kinetic energy greater than 104 electron volts so as to enter said magnetic fields in the direction approximately parallel to the axis of said vacuum chamber so that said particles will follow a closed path;

e. means for changing the charge state of said fusible particles while within said magnetic fields so that the resulting ions are produced within said magnetic fields to form ion beams;

f. said injection and change-in-charge-state being accomplished for a period of time so that said ion beams attain a density greater than $10^{12}$ particles per cubic centimeter;

g. said ion beams consisting of fusible species such as deuterons and tritons whose velocities are approximately in the same direction and whose speeds differ so as to cause fusion reactions in overtaking collisions between said ion beams, this being stated mathematically:

$$V_D = V_T + V_{rel}$$

where $V_D$ represents the velocity of one species of fusible ions, such as deuterons, $V_T$ represents the velocity of another species of fusible ions, such as tritons, and $V_{rel}$ represents the difference in velocity of said fusible species, such as deuterons and tritons;

h. said ion beams such as deuterons and tritons having approximately equal momentum per unit charge this being stated mathematically:
   $Q_D$: electric charge of species D
   $Q_T$: electric charge of species T $$Q_T M_D V_D = M_T V_T Q_D$$

where $M_D$ and $V_D$ represent, respectively, the mass and the velocity of one species of fusible ions, such as deuterons, and $M_T$ and $V_T$ represent, respectively, the mass and the velocity of another species of fusible ions, such as tritons;

i. means for producing electrons within and in the vicinity of said ion beams so as to substantially neutralize the charge of said ion beams, thereby producing an essentially neutral plasma.

2. The invention of claim 1 for producing nuclear fusion reactions modified in that means for producing magnetic fields are further defined to be of the "strong-focusing" type having alternating-gradients in successive magnets.

3. The invention of claim 1 for producing nuclear fusion reactions modified in that means for producing magnetic fields are further defined to be of the "strong-focusing" type in the essentially straight portion of said elongated vacuum chamber, and are of the "cyclotron" type, having north and south magnetic poles, positioned at the connecting end portions of the vacuum chamber.

4. The invention of claim 1 for producing nuclear fusion reactions modified in that means for producing magnetic fields are further defined to be produced by solenoids, for which the magnetic field vector is parallel to the axis of said vacuum chamber.

5. The invention of claim 1 for producing nuclear fusion reactions modified in that means for producing magnetic fields are further defined in that the magnetic fields are produced by solenoids, said field-producing windings being distributed on the surface of a "figure-eight" configuration.

6. The invention of claim 1 for producing nuclear fusion reactions modified in that means for producing electric fields are further defined in that the electric fields are of the "strong-focusing" type having alternating-gradient electric fields in successive units.

7. The invention of claim 4 for producing nuclear fusion reactions modified in that means for producing magnetic fields are further defined in that "cyclotron" type magnet means, having north and south poles, are superimposed on the solenoidal windings, at the connecting end portions of the vacuum chamber.

8. The invention of claim 5 for producing nuclear fusion reactions modified in that means for producing magnetic fields are further defined in that "cyclotron" type magnet means, having north and south poles, are superimposed on the solenoidal windings of the figure-eight configuration, at the connecting end portions of the vacuum chamber.

9. The invention of claim 1 for producing nuclear fusion reactions further defined to include deuterons and tritons as the fusible species.

10. The invention of claim 1 for producing nuclear fusion reactions further defined to include deuterons of approximately 1,500,000 electron-volts energy and tritons of approximately 1,000,000 electron-volts energy, as nominal values of kinetic energy after being trapped in the magnetic field.

11. The invention of claim 1 for producing nuclear fusion reactions further defined to include deuterons of approximately 1,800,000 electrons-volts energy and $He^3$, namely doubly-charged helium ions which have the isotopic mass number of three, of 4,800,000 electron-volts energy, as nominal values of kinetic energy after being trapped in the magnetic field, these kinetic energy values being applicable in the laboratory frame of reference and which satisfy the relation:

$$Q_{He} M_D V_D = Q_D M_{He} V_{He}$$

where $Q_D$ and $Q_{He}$ represent, respectively, the ionic charges of a deuteron and a helium nucleus, $M_D$ and $V_D$ represent, respectively the mass and the velocity of a deuteron, $M_{He}$ and $V_{He}$ represent, respectively, the mass and the velocity of the doubly-charged helium ions which have the isotopic mass number of three.

12. The invention of claim 1 for producing nuclear fusion reactions further defined to include deuterons of approximately 1,600,000 electron-volts energy, tritons of approximately 1,000,000 electron-volts energy, and $He^3$ doubly-charged ions of approximately 4,800,000 electron-volts energy, all three types of ions having velocities in the same direction and essentially parallel to each other and to the axis of the vacuum chamber.

* * * * *